United States Patent [19]

Sharp, Jr.

[11] 3,926,704
[45] Dec. 16, 1975

[54] FORCE VARIATION MEASUREMENTS ON UNVULCANIZED TIRES

[75] Inventor: William J. Sharp, Jr., Union City, Tenn.

[73] Assignee: The Goodyear Tire & Rubber Company, Akron, Ohio

[22] Filed: Dec. 2, 1974

[21] Appl. No.: 528,748

[52] U.S. Cl. .................... 156/126; 73/146; 156/75; 156/128 I
[51] Int. Cl.² .................. B29H 17/02; G01M 17/02
[58] Field of Search ......... 156/126, 128 I, 123, 415, 156/416, 417, 420, 75; 73/146

[56] References Cited
UNITED STATES PATENTS

| | | | |
|---|---|---|---|
| 2,429,032 | 10/1947 | Sheahan | 156/75 |
| 3,070,478 | 12/1962 | Riddle | 156/126 |
| 3,142,178 | 7/1964 | Gough et al. | 73/146 |
| 3,352,732 | 11/1967 | Darr | 156/75 |
| 3,374,138 | 3/1968 | Porter et al. | 156/416 X |
| 3,375,714 | 4/1968 | Bottasso | 73/146 |
| 3,473,422 | 10/1969 | Leblond | 73/146 |
| 3,656,343 | 4/1972 | Braden et al. | 73/146 |
| 3,676,262 | 7/1972 | Leblond | 156/417 |
| 3,722,270 | 3/1973 | Sperberg | 73/146 |
| 3,862,570 | 1/1975 | Ongaro | 73/146 |
| 3,867,230 | 2/1975 | VanHorn et al. | 156/415 |
| 3,873,397 | 3/1975 | Leblond et al. | 156/415 |

*Primary Examiner*—Clifton B. Cosby
*Attorney, Agent, or Firm*—F. W. Brunner; M. L. Gill

[57] ABSTRACT

A method of reducing the conicity exhibited by pneumatic tires during operation, which method includes building a belted pneumatic tire and subjecting the unvulcanized tire to force variation tests to determine the conicity. The conicity of the unvulcanized tire is then compared to a predetermined maximum allowable conicity and the tire building machine is then adjusted to move the axial position of the belt structure on the tire carcass in subsequent tires to reduce the conicity in subsequent tires built on that machine.

The foregoing abstract is not to be taken as limiting the invention of this application, and in order to understand the full nature and extent of the technical disclosure of this application, reference must be made to the accompanying drawing and the following detailed description.

14 Claims, 6 Drawing Figures

U.S. Patent    Dec. 16, 1975    3,926,704
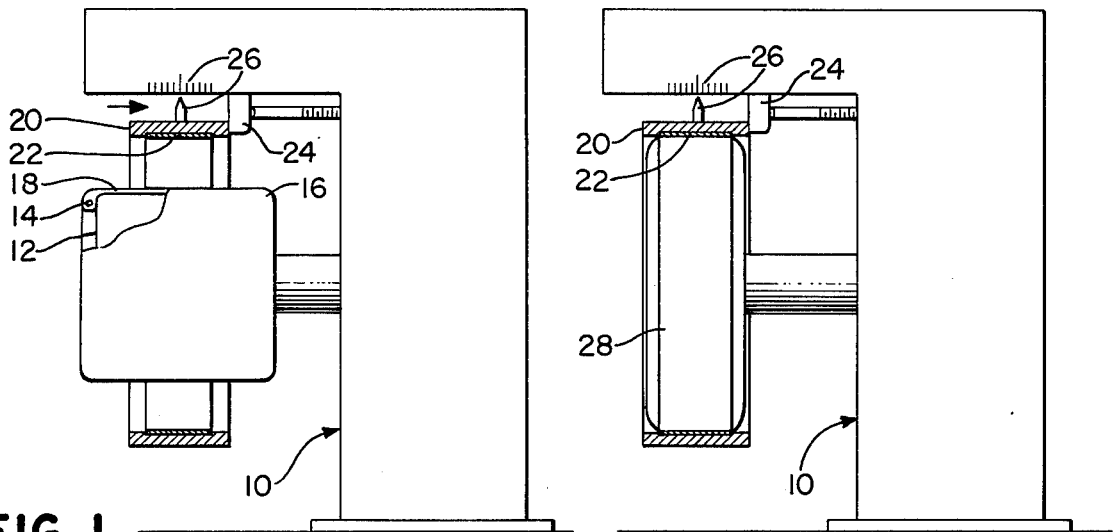
FIG. 1
FIG. 2
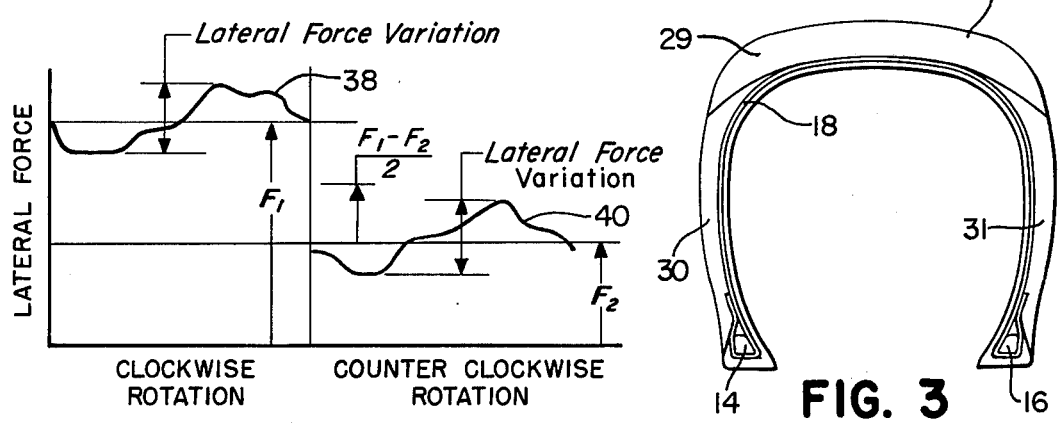
FIG. 5
FIG. 3
FIG. 4
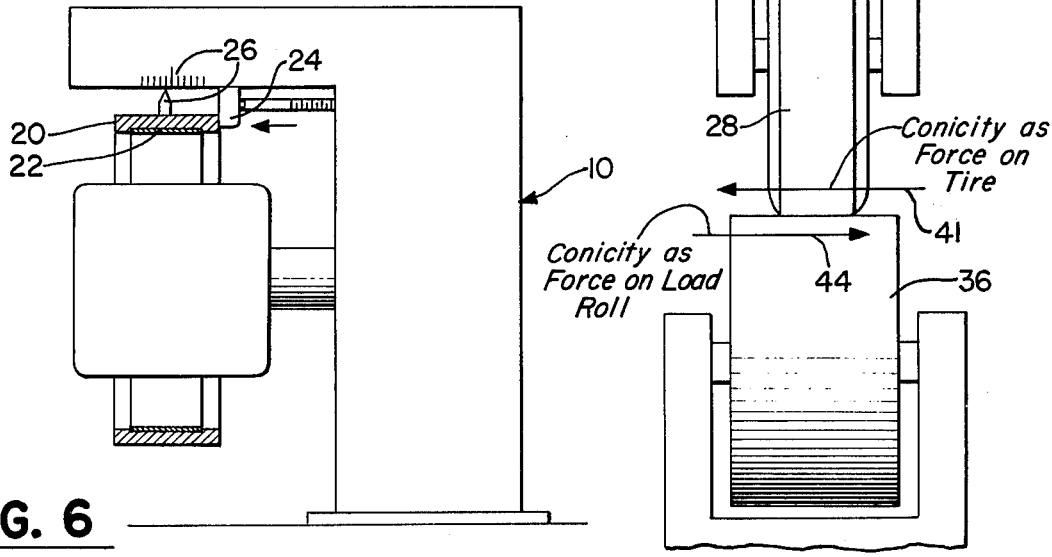
FIG. 6

FORCE VARIATION MEASUREMENTS ON UNVULCANIZED TIRES

This invention relates to a method of manufacturing pneumatic tires and in particular to a method of providing belted pneumatic tires which exhibit a reduced conicity.

It is known that, due to the nature of a pneumatic tire and the present methods of manufacturing pneumatic tires, such tires exhibit at least some degree of non-uniformity. The non-uniformity in the tire has been measured and studied in many ways. Some examples of measurements of the non-uniformities of tires include balance, tread gauge variation, radial and lateral run-out, radial and lateral force variation, and an average or net lateral force exerted in one direction during rotation.

Various methods have been proposed and utilized to reduce certain of these non-uniformities. For example, radial force variation can be reduced by grinding both axially outer ribs of the tire at the point of high radial force. The tire tread surface can also be ground to reduce radial runout.

Further, it has been proposed that one axially outer rib can be ground completely around the tire to reduce the net axial thrust or net lateral force exhibited by the tire during rotation. Further, it has been proposed that when tires built on a particular machine continually exhibit a large net axial thrust or lateral force in one direction the axial position of the belt structure on the carcass structure can be adjusted to one axial direction or another to reduce the axial thrust in subsequent tires built on that machine.

BRIEF DESCRIPTION OF THE INVENTION

The present invention relates to a method of providing pneumatic tires which exhibit a low value of net axial thrust without the necessity of grinding or removing rubber from the axially outer rib. The present invention also has the advantage over the prior art methods of reducing net axial thrust in that operator or machine errors can be detected quickly and corrected and thus reduce the number of tires built before proper adjustments are made.

The present invention relates to a process in which a meaningful value of the conicity of a tire is determined immediately subsequent to the building of the tire and without the necessity of waiting for a large number of tires to be cured. This value of the conicity is then compared to a predetermined maximum allowable and the proper adjustments are immediately made to the building machine or the building operation to reduce the conicity in subsequent tires.

It is an object, therefore, of the present invention to provide a quick response method of determining if tires being built will or will not exhibit high conicity values when cured and a means of adjusting the manufacturing operation in response to such readings to reduce the conicity of subsequent tires.

BRIEF DESCRIPTION OF THE DRAWINGS

FIG. 1 is a schematic elevational view of a tire building machine having a tire partially built thereon;

FIG. 2 is a schematic elevational view of the machine of FIG. 1 and illustrating the application of a belt structure to a pneumatic tire;

FIG. 3 is a cross-sectional view of the tire shown in FIG. 2 as it would appear after building but before vulcanizing;

FIG. 4 is a schematic view illustrating an uncured pneumatic tire being tested for force variations on a conventional force variation machine;

FIG. 5 is a graphical illustration of the determination of the conicity of the tire being tested on the force variation machine illustrated in FIG. 4; and FIG. 6 is an elevational view of the tire building machine in FIGS. 1 and 2 and illustrating the axial adjustment of the location of the mechanism for positioning the belt structure on pneumatic tires.

DETAILED DESCRIPTION OF THE INVENTION

With reference to FIG. 1, there is schematically illustrated a tire building machine 10 including a rotatable drum 12 on which a tire carcass 28 is built. The specific details or type of tire building machine are not part of the present invention and the specific machine illustrated is only one example of the machines that can be used. In the process of manufacturing the tire on the machine 10 the various tire components such as a pair of inextensible beads 14 and 16 and cord carcass plies 18 extending from bead to bead are assembled on the building drum 12. A rigid transfer O-ring 20 having a belt structure 22 accurately positioned within its inner periphery is moved axially over the tire building drum 12 to a predetermined position against a stop means schematically illustrated at 24. A means for accurately indicating the axial position of the O-ring 20 relative to the drum is schematically illustrated at 26.

With reference to FIG. 2, the drum 12 is axially collapsed and radially expanded to expand the tire carcass 28 including the carcass plies 18 into engagement with the belt structure 22 accurately located within the transfer O-ring 20. The normal tackiness of the unvulcanized rubber will cause the belt structure 22 to adhere to the tire carcass 28. The belt structure 22 is released from the transfer O-ring 20 which is then moved axially away from the tire 28.

Additional components such as tread rubber 29 and sidewall rubber 30 and 31 illustrated in FIG. 3 are applied to the tire carcass 28 and belt structure 22 in any manner known to those skilled in the art.

With reference to FIG. 4, the tire carcass 28 is placed on a force variation machine. Force variation machines are well known to those skilled in the art and, therefore, the details of the machine will not be discussed in detail herein. However, it is necessary that the machine be capable of determining lateral forces exerted by a tire during rotation on its supporting surface so that at least a relative measurement of the conicity or pseudo-camber can be made.

In the particular example illustrated, the pseudo-camber or conicity is determined by what is known as the forward-reverse rotation method. In this method, the tire is mounted on the force variation machine and inflated to a predetermined inflation pressure. The tire is then urged against the load roll 36 and rotated in a clockwise direction. The lateral force variation is determined throughout at least one revolution of the tire. From the lateral force variation curve 38 which is illustrated in FIG. 5 a mean lateral force $F_1$ is determined. The tire is then rotated in a counter-clockwise direction and the lateral force variation curve 40 is determined and the second mean lateral force $F_2$ is determined. One-half of the algebraic difference between $F_1$ and $F_2$ is equal to the conicity of the tire. If this conicity value is beyond a predetermined acceptable limit, the stop means 24 on the tire building machine 10 is adjusted axially to one side or the other to thereby adjust the location of the belt structure relative to axial directions on the tire carcass structure 28 during the expansion of the tire into the O-ring.

The direction of adjustment of the axial position of the belt structure on the carcass is dependent upon the direction of the conicity vector. The position of the belt structure on the tire carcass is adjusted axially in the direction of the conicity which is exerted on the tire. This conicity as seen by or acting on the tire acts in the exact opposite direction as the conicity or net lateral force as seen by or exerted on the load roll 36. Thus, in the particular example illustrated in FIG. 4, the conicity value as a force on the tire 28 acts to the left as indicated by the arrow 41. The belt structure on subsequent tires will, therefore, be moved to the left as indicated by the arrow 42. As will be appreciated, the conicity as a force on the load roll 36 in this case will act toward the right as indicated by the arrow 44.

The amount of axial adjustment of the location of the belt structure on the carcass is dependent upon the magnitude of the conicity and the type and construction of the tire being built. This amount of movement is determined empirically. A specific example will serve to illustrate the procedure.

A series of load range B, steel-belted radial ply tires size GR 78-15 of a specific construction were built on a specific machine. These tires were inflated to their design inflation pressure or 24 pounds per square inch. For load range C and D tires of the same size, the pressure would be 28 pounds per square inch and 32 pounds per square inch, respectively. The tires were then mounted on a force variation machine and loaded to 590 pounds on the load roll or 50 percent of the design load of the tire. Preferably, the load is equal to between 40 and 70 percent of the design load. Their conicity values were determined under these conditions and recorded.

These same tires were then cured and the conicity values were determined in a normal manner. Specifically, the tires were inflated to 24 pounds per square inch, loaded to design load of 1180 pounds and the conicity recorded. Again, if the tires are load range C or D they would be inflated to 28 and 32 pounds per square inch respectively and loaded to design load on the force variation machine. A correlation was then established between the conicity values of the tire in the unvulcanized state and the conicity values of the tire in the vulcanized state.

It was observed that all of the conicity values were within a close range. The axial location of the belt structure on the second series of tires was adjusted a known amount in the direction of the conicity acting on the tire. A second series of tires was then built and the conicity values again observed, both in the unvulcanized and vulcanized states.

Through a series of these tests, it was determined that, for this size and type tire being built on the specific machine, for every 10 pounds of conicity the belt structure should be moved ten thousandths of an inch in the direction of the conicity acting on the tire. Therefore, in the specific example illustrated, if the tire 28 is a size GR 78-15 steel-belted radial ply tire of the specific construction and the conicity 40 is equal to 10 pounds the transfer O-ring 20 should be moved ten thousandths of an inch to the left as illustrated in FIG. 6.

It will be appreciated that the amount of movement of the belt structure in response to a given conicity will depend upon the type of tire such as by way of example only, steel or fabric-belted, radial or bias carcass plies, the type of machine on which the tire is being built, etc.

Further, it will be appreciated in the specific example illustrated, the conicity was determined by the forward-reverse rotation method and considered to be equal to one-half of the algebraic difference in the two mean lateral forces $F_1$ and $F_2$. It will be appreciated that, since the axial movement of the belt is determined empirically, a usable measure or value for the conicity could have been the difference between the mean lateral forces determined by the forward-reverse rotation method which will be equal to exactly twice the conicity as determined in the example discussed above. If this method were used, it will be appreciated that the conicity value would be equal to twice that of the example above and, therefore, the axial movemnt of the belt structure would be equal to five thousandths of an inch per 10 pounds of conicity. In any event, since the movement of the belt structure is determined empirically, any relative measure or value of the conicity can be used when determining the amount of axial adjustment to be required.

The present process can be used to advantage by periodically monitoring the conicity values of the unvulcanized pneumatic tire being built on each machine and each machine would then be adjusted accordingly. Depending upon the accuracy of the machine and building operation, it may be desirable to adjust the machines at intervals of once a shift, once a day, or once a week.

While certain representative embodiments and details have been shown for the purpose of illustrating the invention, it will be apparent to those skilled in the art that various changes and modifications may be made therein without departing from the spirit or scope of the invention.

What is claimed is:

1. In a process of manufacturing a belted pneumatic tire on a tire building machine of the type having means to position an uncured belt structure on an uncured carcass structure in a predetermined location on said carcass structure relative to axial directions, the improvement comprising: after said belt structure is placed on said carcass structure but before said tire is vulcanized determining the conicity of said tire, comparing said conicity with a predetermined maximum allowable conicity for the unvulcanized tire and adjusting the predetermined location on said carcass structure relative to axial directions to reduce the conicity in subsequent tires built on said machine to within the maximum allowable conicity.

2. The process claimed in claim 1, wherein the belt structure is moved relative to said carcass structure in the axial direction of the conicity which is exerted on the tire.

3. The process claimed in claim 2, wherein the conicity is determined on a tire force variation measuring machine including a load roll with the tire inflated to design inflation pressure and loaded on the load roll to between 40 and 70 percent of design load.

4. The process claimed in claim 2, wherein the conicity of the tire is determined after the tread rubber has been provided on the carcass structure.

5. The process claimed in claim 2, wherein the maximum allowable conicity for the unvulcanized tires is determined by:
   a. determining the conicity of a series of unvulcanized tires of the same construction and size,
   b. vulcanizing the series of tires,
   c. determining the conicity of the tires after they are vulcanized, and
   d. comparing the conicity of the unvulcanized tires to the conicity of the vulcanized tires and a predetermined maximum allowable conicity for vulcanized tires.

6. The process claimed in claim 4, wherein the maximum allowable conicity for the unvulcanized tires is determined by:
   a. determining the conicity of a series of unvulcanized tires of the same construction and size,
   b. vulcanizing the series of tires,
   c. determining the conicity of the tires after they are vulcanized, and
   d. comparing the conicity of the unvulcanized tires to the conicity of the vulcanized tires and a predetermined maximum allowable conicity for vulcanized tires.

7. The process as claimed in claim 2, wherein said tire is a steel-belted passenger car tire and the amount of axial movement of the belt structure is equal to 0.010 inch for each 10 pounds of conicity in the unvulcanized tire.

8. A method of manufacturing pneumatic tires comprising: building an uncured tire carcass, providing a belt structure on said tire carcass in a known axial position relative to an axial reference point, prior to vulcanizing said tire determining the conicity of said tire carcass and belt structure, comparing said conicity to a predetermined allowable maximum conicity and adjusting said axial position on said tire relative to said axial reference point in the building of subsequent tires to provide that the magnitude of the conicity in said subsequent tire is within the maximum allowable conicity value.

9. The method claimed in claim 8, wherein the belt structure is moved relative to said tire carcass in the axial direction of the conicity which is exerted on the tire.

10. The method claimed in claim 9, wherein the conicity is determined on a tire force variation measuring machine including a load roll with the tire inflated to design inflation pressure and loaded on the load roll to between 40 and 70 percent of design load.

11. The method claimed in claim 9, wherein the conicity of the tire is determined after the tread rubber has been provided on the carcass.

12. The method claimed in claim 9, wherein the maximum allowable conicity for the unvulcanized tires is determined by:
   a. determining the conicity of a series of unvulcanized tires of the same construction and size,
   b. vulcanizing the series of tires,
   c. determining the conicity of the tires after they are vulcanized, and
   d. comparing the conicity of the unvulcanized tires to the conicity of the vulcanized tires and a predetermined maximum allowable conicity for vulcanized tires.

13. The method claimed in claim 1, wherein the maximum allowable conicity for the unvulcanized tires is determined by:
   a. determining the conicity of a series of unvulcanized tires of the same construction and size,
   b. vulcanizing the series of tires,
   c. determining the conicity of the tires after they are vulcanized, and
   d. comparing the conicity of the unvulcanized tires to the conicity of the vulcanized tires and a predetermined maximum allowable conicity for vulcanized tires.

14. The method as claimed in claim 9, wherein said tire is a steel-belted passenger car tire and the amount of axial movement of the belt structure is equal to 0.010 inch for each 10 pounds of conicity in the unvulcanized tire.

* * * * *

UNITED STATES PATENT OFFICE
CERTIFICATE OF CORRECTION

PATENT NO. : 3,926,704
DATED : December 16, 1975
INVENTOR(S) : William J. Sharp, Jr.

It is certified that error appears in the above-identified patent and that said Letters Patent are hereby corrected as shown below:

Column 6, claim 13, line 25, "claim 1" should read -- claim 11 --.

Signed and Sealed this

Twenty-first Day of September 1976

[SEAL]

Attest:

RUTH C. MASON
Attesting Officer

C. MARSHALL DANN
Commissioner of Patents and Trademarks